Dec. 16, 1958         J. W. SCHWENK         2,864,618
ARROWHEADS
Filed May 1, 1957

INVENTOR
John W. Schwenk
BY
ATTORNEY

United States Patent Office 2,864,618
Patented Dec. 16, 1958

2,864,618

ARROWHEADS

John W. Schwenk, St. Paul, Minn.

Application May 1, 1957, Serial No. 656,402

8 Claims. (Cl. 273—106.5)

This invention relates to an improvement in arrowheads and deals particularly with an arrowhead fabricated from three main portions of sheet metal, high carbon steel or the like.

Numerous types of arrowheads have been produced which are fabricated of sheet metal or the like. Certain such arrowheads comprise a blade of suitable type having a blunt rear end, the blade being axially notched from this blunt end to receive a tubular ferrule. The tubular ferrule which is usually tapered from a relatively small diameter forward end to a larger diameter rear end is secured to the blade in any suitable manner as by spot welding or the like. Other arrowheads have been made which include a blade somewhat similar to that previously described having a pair of ferrule forming portions which are provided with generally radially extending marginal flanges, the flanges being spot welded or otherwise secured to opposite sides of the blade. A purpose of the present invention lies in the provision of an arrowhead having a blade somewhat similar to that described and having two identical ferrule forming portions, each of which includes a body of tapered form which is generally semi-circular in cross section and which is provided with longitudinally spaced ears projecting from opposite edges thereof. These ears include short portions which form continuations of the side edges of the body and which are bent outwardly to provide outwardly projecting extremities which are arranged on common planes. When the two ferrule forming portions are combined, the short portions of the ears which form continuations of the side edges of the body overlap so that each ferrule forming portion includes a body lying on one side of the plane of the blade and ear portions lying on the opposite side of the blade. These ear portions are spot welded or otherwise secured in surface contact with the blade.

A feature of the present invention lies in the provision of an arrowhead of the type described in which the ear ends on one ferrule forming portion are longitudinally offset from the ear ends of the other ferrule forming portion which lie on the opposite surface of the blade on each side of the notch. Thus, in spot welding each ear end to the blade, the spot welding extends through only two thicknesses of metal, one of which is the ear end and the other of which is a portion of the blade.

A feature of the present invention lies in the provision of an arrowhead of the type described in which the ears projecting from one side of each ferrule forming portion are in longitudinally staggered relation to the ears projecting from the opposite edge of this ferrule forming portion. Thus, in the finished form of the blade, the ears on one side of the blade are in staggered relation to the ears engaging the opposite surface thereof.

A further feature of the present invention resides in the provision of a blade of the type described having a marginal flange projecting from the small diameter end of each ferrule forming portion which lies on a plane parallel to and spaced from the planes of the ears of that portion. As a result this flange may be spot welded to one surface of the blade while the ends of the ears of that ferrule forming portion are spot welded to the opposite surface of the blade.

A further feature of the arrangement described lies in the fact that a force tending to enlarge the ferrule exerts a force which is transmitted to the ears of the two ferrule forming portions which force is opposed by the body of the blade itself. As a result, the ferrule is stronger than would otherwise be possible.

These and other objects and novel features of the present invention will be more clearly and fully set forth in the following specification and claims.

In the drawing forming a part of the specification:

Figure 1:
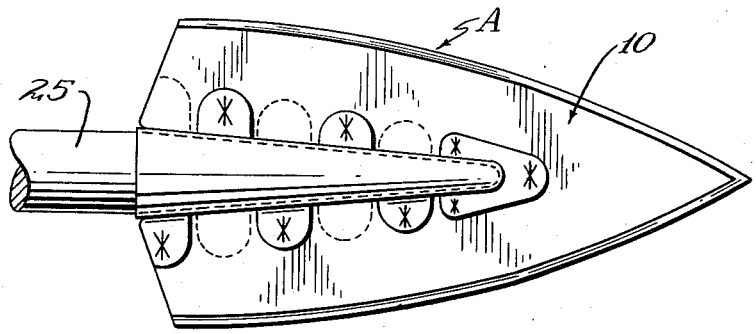
Figure 1 is a plan view of the arrowhead in its completed form.

The arrowhead is indicated in general by the letter A and includes a blade 10 which is of any desired shape or contour. In the particular arrangement illustrated, the blade 10 is widest at its rear end and includes sharpened outer edges 11 and 12 which taper to a point 13 at the forward end of the blade. The rear edges of the blade portion 10 taper inwardly and rearwardly as indicated at 14 and 15 respectively.

A notch 16 extends axially into the blade 10 from the rear edge thereof, this notch 16 including converging side edges 17 and 19 which terminate in a rounded forward end 20. The taper of the sides 17 and 19 are similar to the taper of the ferrule formed by the two ferrule forming portions.

Figures 2, 3:
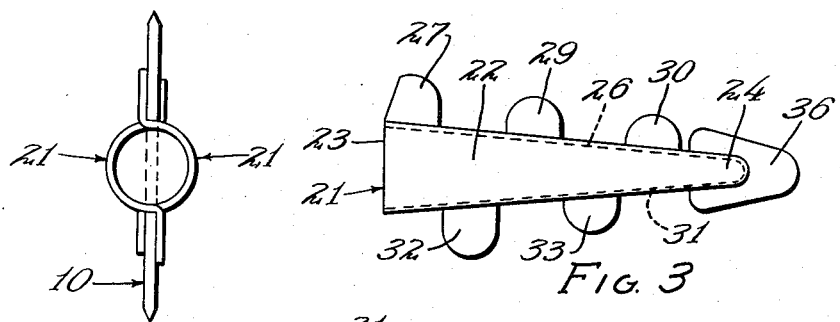
Figure 2 is an end view of the arrowhead showing the arrangement of parts therein.
Figure 3 is a plan view of one of the ferrule forming parts.
Figure 4:
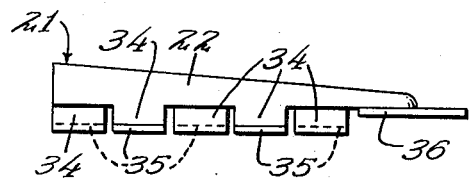
Figure 4 is a side elevational view of the ferrule forming part shown in Figure 3.
Figure 5:
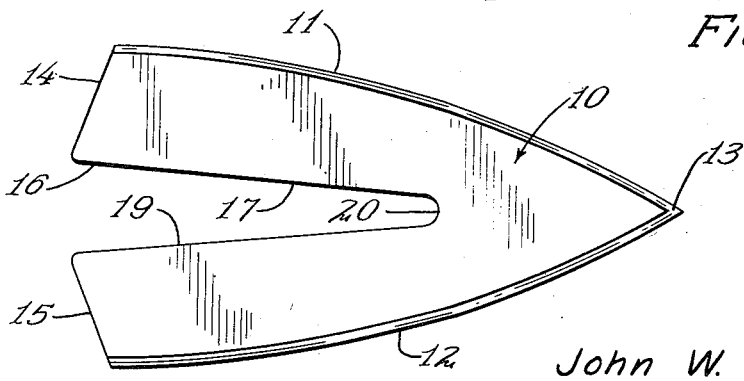
Figure 5 is a plan view of the blade to which the ferrule forming parts are secured.

The ferrule of the arrowhead A is formed of two identical ferrule forming portions illustrated in general by the numeral 21 and best illustrated in Figures 3 and 4 of the drawings. Each ferrule forming portion 21 includes a body 22 which is substantially semi-conical in form, the body tapering from the large diameter inlet end 23 to the relatively small radius forward extremity 24. The body 22 is generally semi-circular in cross section at any point throughout its length so that when the two ferrule forming portions are combined, they form a socket for the tapered forward end of an arrow shaft 25.

As is best indicated in Figure 3 of the drawings, one side edge 26 of the body 22 is provided with a series of three spaced ears projecting therefrom, the ears being identified by the numerals 27, 29 and 30. The other side edge 31 of the body 22 is provided with a pair of spaced ears 32 and 33 projecting therefrom. As will be evident from Figure 3, the ears 27, 29 and 30 on one side of the body are in longitudinally offset or staggered relation to the ears 32 and 33 on the other side of the body. As a result of this arrangement, when two ferrule forming portions 21 are combined to form the shaft socket, the ears 32, 33 will extend between the ears 27, 29 and 30 of the corresponding section.

As may be noted from the drawings, each ear is generally L-shaped in cross section including a short connecting portion 34 and a substantially right angularly extending ear extremity 35. The flat extremities 35 on opposite sides of the body 22 are arranged in a substantially common plane so that one surface of each of the ears may lie flush against a surface of the blade 10.

The short connecting portions 34 are of proper length so that the blade engaging surfaces which are shown uppermost in Figures 3 and 4 of the drawings are spaced so that when two similar sections are combined, the blade 10 may extend therebetween. In other words, the flat surfaces of the ears which contact the blade 10 are on a plane spaced from a parallel plane through the center of curvature of the body portion 22 a distance substantially equal to half the thickness of the blade 10. Thus, when the two ferrule forming portions are combined as indicated in Figure 2 of the drawings, the blade 10 may extend therebetween when the cross section through the two body portions 22 are circular.

Each ferrule forming portion 21 also includes an anchoring flange 36 which is secured marginally to the small diameter end portion 24 of the body 22, the flange 36 being so positioned that the undersurface thereof as viewed in Figure 4 is spaced from the plane of the upper surfaces of the anchoring portions 35 of the ears a distance substantially equal to the thickness of the blade 10. Thus, when the upper surfaces of the ears are in surface contact with the undersurface of the blade, the undersurface of the flange 36 will engage the upper surface of the blade 10.

In assembling the arrowhead, the two ferrule forming portions 21 are preferably arranged in opposed relation, and the blade 10 is then slid between the ears of the two sections 21, the connecting portions 34 of the ears extending through the slot 16 in the blade in overlapping relationship. When the three parts are properly located, they are spot welded together. As the ears on one side of the blade are longitudinally offset or staggered with relation to the ears on the opposite sides thereof, the spot welding of the ears to the blade extends through only two thicknesses of metal. The flanges 36 are spot welded on opposite sides of the blade, these flanges being in opposed relation so that the spot welding operation extends through three thicknesses of material at this point.

In accordance with the patent statutes, I have described the principles of construction and operation of my improvement in arrowheads, and while I have endeavored to set forth the best embodiments thereof, I desire to have it understood that changes may be made within the scope of the following claims without departing from the spirit of my invention.

I claim:

1. An arrowhead construction including a blade having an axial notch therein, and a ferrule forming a shaft receiving socket, said ferrule including a pair of tapered ferrule forming members including a body substantially semi-circular in cross-section and having outwardly directed ears projecting tangentially and then laterally from the edges thereof in spaced relation, the tangential portions of said ferrules extending through said notch, and the laterally projecting portions of said ears of each ferrule forming member extending on one side of the plane of the blade and secured in surface contact thereto and the body thereof lying on the other side of the plane of the blade.

2. An arrowhead including a flat blade having a blunt end, a notch extending into the blade from the blunt end thereof along the blade axis, and a ferrule formed of two ferrule forming portions, each ferrule forming portion including a tapered body substantially semi-circular in cross-section and ears connected to opposite side edges thereof in longitudinally spaced relation, said ears including short portions forming continuations of the edges of the body, and right angularly extending portions extending in a common plane, the ears on each side of one ferrule forming member alternating with the ears on the corresponding sides of the other ferrule forming member, said short portions of said ears overlapping and extending through said notch in said blade, said right angularly extending portions being secured in surface contact with opposite surfaces of said blade.

3. The structure of claim 2 and in which said ferrule forming portions are identical.

4. The structure of claim 2 and in which the ears projecting from one side edge of said body portion are longitudinally offset from the ears projecting from the opposite side edge thereof.

5. The structure of claim 4 and in which said ferrule forming portions are identical.

6. The structure of claim 2 and in which the ears overlying one surface of said blade are longitudinally offset from the ears on the opposite surface thereof on each side of said notch.

7. The structure of claim 2 and including a flange at the small end of each ferrule forming portion on a plane parallel to, and spaced from, the plane of the right angularly extending portions of the ears of said ferrule portion.

8. The structure of claim 7 and in which the flange of each ferrule forming portion is secured in surface contact with the opposite surface of the blade from that engaged by the ears of that ferrule forming portion.

References Cited in the file of this patent

UNITED STATES PATENTS

| 2,182,320 | Pearson | Dec. 5, 1939 |
| 2,373,216 | Zwickey | Apr. 10, 1945 |